United States Patent
Dworak et al.

(10) Patent No.: US 10,741,997 B2
(45) Date of Patent: Aug. 11, 2020

(54) POWERING AN ELECTRONIC SYSTEM WITH AN OPTICAL SOURCE TO DEFEAT POWER ANALYSIS ATTACKS

(71) Applicants: Jennifer Lynn Dworak, Dallas, TX (US); Ping Gui, Dallas, TX (US); Scott McWilliams, Rotterdam, NY (US); Gary Alan Evans, Plano, TX (US)

(72) Inventors: Jennifer Lynn Dworak, Dallas, TX (US); Ping Gui, Dallas, TX (US); Scott McWilliams, Rotterdam, NY (US); Gary Alan Evans, Plano, TX (US)

( * ) Notice: Subject to any disclaimer, the term of this patent is extended or adjusted under 35 U.S.C. 154(b) by 0 days.

(21) Appl. No.: 16/177,089

(22) Filed: Oct. 31, 2018

(65) Prior Publication Data
US 2020/0136346 A1 Apr. 30, 2020

(51) Int. Cl.
| | |
|---|---|
| H01S 5/042 | (2006.01) |
| H01L 31/04 | (2014.01) |
| H01S 5/068 | (2006.01) |
| H01L 23/58 | (2006.01) |

(52) U.S. Cl.
CPC .............. *H01S 5/042* (2013.01); *H01L 23/58* (2013.01); *H01L 31/04* (2013.01); *H01S 5/06804* (2013.01)

(58) Field of Classification Search
CPC ..... H01S 5/042; H01S 5/06804; H01L 23/58; H01L 31/04
See application file for complete search history.

(56) References Cited

U.S. PATENT DOCUMENTS

| | | | |
|---|---|---|---|
| 6,507,913 B1 * | 1/2003 | Shamir | G06K 19/073 713/300 |
| 7,209,503 B1 | 4/2007 | Hopper et al. | |
| 7,899,190 B2 | 3/2011 | Gebotys | |
| 8,091,139 B2 | 1/2012 | Kilmov | |
| 8,184,806 B2 | 5/2012 | Gebotys | |
| 8,331,557 B2 | 12/2012 | Ebied | |
| 8,390,311 B2 | 3/2013 | Kyne et al. | |
| 8,638,944 B2 | 1/2014 | Gebotys | |
| 8,645,703 B2 | 2/2014 | Ebeid | |
| 8,804,949 B2 | 8/2014 | Fontana et al. | |
| 8,817,973 B2 | 8/2014 | Itoh | |

(Continued)

FOREIGN PATENT DOCUMENTS

| | | |
|---|---|---|
| EP | 2148462 A1 | 1/2010 |

OTHER PUBLICATIONS

Shahrjerdi et. al. "Shielding and securing integrated circuits with sensors", 2014 IEEE/ACM International Conference on Computer-Aided Design (ICCAD), Date of Conference: Nov. 2-6, 2014, Date Added to IEEE (Year: 2014).*

(Continued)

*Primary Examiner* — Eleni A Shiferaw
*Assistant Examiner* — Bassam A Noaman
(74) *Attorney, Agent, or Firm* — Vinson & Elkins L.L.P.

(57) ABSTRACT

A device that is capable of eliminating a power trace that can be analyzed in a power analysis attack and serves as a highly effective countermeasure against power analysis attacks. The device comprising an optical source providing optical energy to an integrated circuit. An optical detector optically linked to the optical source and converts the optical energy from the optical source into electrical energy to power a secure circuit.

17 Claims, 6 Drawing Sheets

(56) References Cited

U.S. PATENT DOCUMENTS

| | | | |
|---|---|---|---|
| 8,832,462 | B2 | 9/2014 | Trimberger |
| 2011/0258459 | A1 | 10/2011 | Guilley et al. |
| 2014/0098951 | A1 | 4/2014 | Choi et al. |
| 2015/0195082 | A1* | 7/2015 | Han .................. H04L 9/003 |
| | | | 713/189 |

OTHER PUBLICATIONS

Matthew Mayhew "Design of an On-Chip Power Analysis Attack Countermeasure Incorporating a Randomized Switch Box", a Thesis presented to the University of Guelph. (Year: 2016).*

Weigl et. al., Oxidized GaAs QW vertical-cavity lasers with 40% power conversion efficiency, B. Weigl et al., Electronics Letters, vol. 32, No. 19, Sep. 12, 1996, pp. 1784-1786, hereinafter Weigl. (Year: 1996).*

Cho et. al. "Integrated Detectors for Embedded Optical Interconnections on Electrical Boards, Modules, and Integrated Circuits", IEEE Journal of Selected Topics in Quantum Electronics, vol. 8, No. 6, Nov./Dec. 2002 (Year: 2002).*

Mangard, Stefan et al., "Power Analysis Attacks: Revealing the Secrets of Smart Cards," Springer, 2007.

Popp, Thomas, et al., "Power Analysis Attacks and Countermeasures," IEEE Design & Test of Computers, 2007 IEEE.

Syed Mehdui Dadgar, et al., "Increasing the security of smart cards against power analysis attacks," Advances in Environmental Biology, (Apr. 2014): p. 1301.

Zhu Nian-hao, et al., "A Standard Cell-Based Leakage Power Analysis Attack Countermeasure Using Symmetric Dual-Rail Logic," J. Shanghai Jiaotong Univ. (Sci.), 2014, 19(2): 169-172.

IUCF-HYU Patent Issued for "Apparatus for Clocked Power Logic against Power Analysis Attach," Information Technology Newsweekly, Mar. 19, 2013.

Fan (Terry) Zhang, Ph.D., "Towards Comprehensive Countermeasures to Power Analysis Attacks," U. of Connecticut., 2011.

An Wang, et al., "Power Analysis Attacks and Countermeasures on Ntru-Based Wireless Body Area Networks," Institute for Advanced Study, Tsinghau Univ. May 31, 2013.

RIML Agency Reviews Patent Application Approval Request for "Security Countermeasures for Power Analysis Attacks," Information Technology Newsweekly, Feb. 5, 2013.

\* cited by examiner

POWERING AN ELECTRONIC SYSTEM WITH AN OPTICAL SOURCE TO DEFEAT POWER ANALYSIS ATTACKS

BACKGROUND

1. Field of the Disclosure

The present disclosure relates generally to apparatuses, systems, devices and methods to protect against power analysis attacks on electronic hardware devices. More specifically, the present disclosure relates to an electronic system powered with an optical source such as a laser so as to provide protection against power analysis attacks.

2. Description of Related Art

Present day security often involves using cryptographic algorithms to encrypt secure data. The algorithms themselves are well-known, but they are considered to be very secure from a computational standpoint because knowledge of a secret key is required to encrypt/decrypt the information, and the algorithms are designed to make extraction of that key from observation of the plaintext and/or ciphertext computationally intractable. However, once the secret key is known, the encryption is useless, and an attacker can decrypt all the previously protected secure data. One method of extracting the secret key involves a "brute-force attack," which involves systematically and exhaustively searching for a potential key. The brute-force attack method can be useful when a key is short and simple, but it becomes computationally expensive when the key is long and complex. Given the challenges of extracting the secret key using a brute-force attack, methods based on inferring a key from the physical implementation of a device rather than systematically and exhaustively searching for a key have been devised. These methods are known as side-channel attacks.

One form of side-channel attack is known as a power-analysis attack. When performing a power analysis attack, an attacker seeks to monitor the power being consumed by a device to make inferences about the computations made by the device and thereby extract the secret key. The power analysis attack entails obtaining and then interpreting power traces, which correspond to measurements (such as the current drawn by a circuit) that are indicative of the power being drawn by the circuit as a function of time.

With respect to the power being drawn by a circuit, there are two types of power—static power and dynamic power. Static power is drawn, for example, when sub-threshold leakage current in the circuit occurs. Dynamic power is drawn when circuit switching occurs. In a digital circuit, this switching corresponds to the changing voltage values at the inputs and outputs of logic gates. In general, the amount of circuit switching is related to the function being performed and the way that function is implemented with logic gates, the current values of the circuit's inputs, and the previous values of the circuit's inputs. A circuit that is performing an encryption/decryption algorithm draws a large amount of dynamic power. The attacker sends in plaintext or ciphertext into the device. The attacker then monitors the amount of switching activity that occurs by monitoring the amount of dynamic power drawn. Combining the information from the power trace with the information from the plaintext/ciphertext sent in, an attacker is able to extract the secret key.

The instantaneous power drawn by a circuit differs depending on both the key and the text being encrypted/decrypted, and if appropriate statistical measures are employed, the influence of the key on the power trace can be deduced and the secret key determined. For example, secret keys used to protect the intellectual property contained in FPGAs (Field Programmable Gate Arrays) have been found within several hours of computation simply by monitoring and recording the power drawn during the FPGA bootup cycle for later analysis.

Since the inception of power analysis attacks, many countermeasures have been devised to protect against power analysis attacks. One class of countermeasure methods involves employing various circuit techniques to mask the relationship between the key and the power trace. Within this class of methods, for example, some methods use specially designed standard cells or add logic gates to a design to try to even out the power draw. Others try to insert additional random variables, such as delays or noise, to disguise the effect on the power trace. However, none of these methods are perfect and are less effective because a variable power trace is still made available for analysis and extraction of the secret key.

It is therefore desirable to have a device or method that is capable of completely eliminating a variable power trace that can be analyzed and thereby serve as a highly effective countermeasure against a power analysis attack.

SUMMARY

The present disclosure provides for a system, device, or method that is capable of eliminating a power trace from a device that can be analyzed in a power analysis attack. The present disclosure therefore serves as a highly effective countermeasure against power analysis attacks.

One aspect of the present disclosure is a device comprising an optical source providing optical energy to an integrated circuit. The device also has an optical detector that is optically linked to the optical source and converts optical energy from the optical source into electrical energy. A secure circuit within the integrated circuit receives the electrical energy from the optical detector. The optical source can be a semiconductor laser, a light emitting diode, a fiber laser, or any source of natural or artificial optical energy. Semiconductor lasers can be edge-emitting or vertical cavity surface emitting lasers (VCSELs), or grating-outcoupled surface-emitting lasers (GSEs).

The optical detector can be a solar cell, a photovoltaic, or a reverse biased photoconductive detector.

Another aspect of the device is that the secure circuit is a circuit that performs switching that draws detectable differences in power when performing the switching and the switching can be used to deduce a key or extract secret information.

Another aspect of the device is that the secure circuit can be a cryptographic circuit that performs cryptographic algorithms and draws detectable differences in power when performing the cryptographic algorithm. The secure circuit can also be used to store highly secure data.

Another aspect of the device is that it has a semiconductor die in which the secure circuit is embedded. Further, the device may comprise a plurality of connections between the optical detector and the secure circuit. The plurality of connections are through-semiconductor vias running through a semiconductor die.

Another aspect of the device is that it comprises a secure circuit and a non-secure circuit. An optical source and an optical detector are optically linked and the optical detector converts optical energy into electrical energy. The secure circuit is connected to the optical detector. Electrical leads also provide power to the non-secure circuit and the secure circuit. A controller in the integrated circuit is configured to switch power delivery to the secure circuit from the electrical leads to the electrical energy provided by the optical detector when the secure circuit is performing a cryptographic algorithm and back when the cryptographic algorithm is completed.

Another aspect is an optical source powered integrated circuit that comprises a broad area laser mounted on a first layer of an integrated circuit providing optical energy to a secure circuit. An optical detector is also mounted on the first layer and is optically linked to the broad area laser. The optical detector converts optical energy from the broad area laser into electrical energy to power a secure circuit embedded within a second layer of the integrated circuit beneath the first layer.

Another aspect of the optical source powered integrated circuit is that the optical detector is spaced from the broad area laser so the far-field beam pattern of the broad area laser uniformly illuminates the optical detector. The broad area laser may be gallium arsenide based and the optical detector may be gallium arsenide based. The broad area laser can have a power conversion efficiency of 40% or more and the optical detector can have a total optical to electrical power conversion efficiency of 20% or more.

The novel features and construction of the present disclosure, as well as additional objects thereof, will be understood more fully from the following description when read in connection with the accompanying drawings.

BRIEF DESCRIPTION OF THE DRAWINGS

The present disclosure is further described and explained in relation to the following figures of the drawings wherein.

Like reference numerals are used to describe like parts in all figures of the drawings.

DESCRIPTION OF THE EMBODIMENTS

Figure 1:
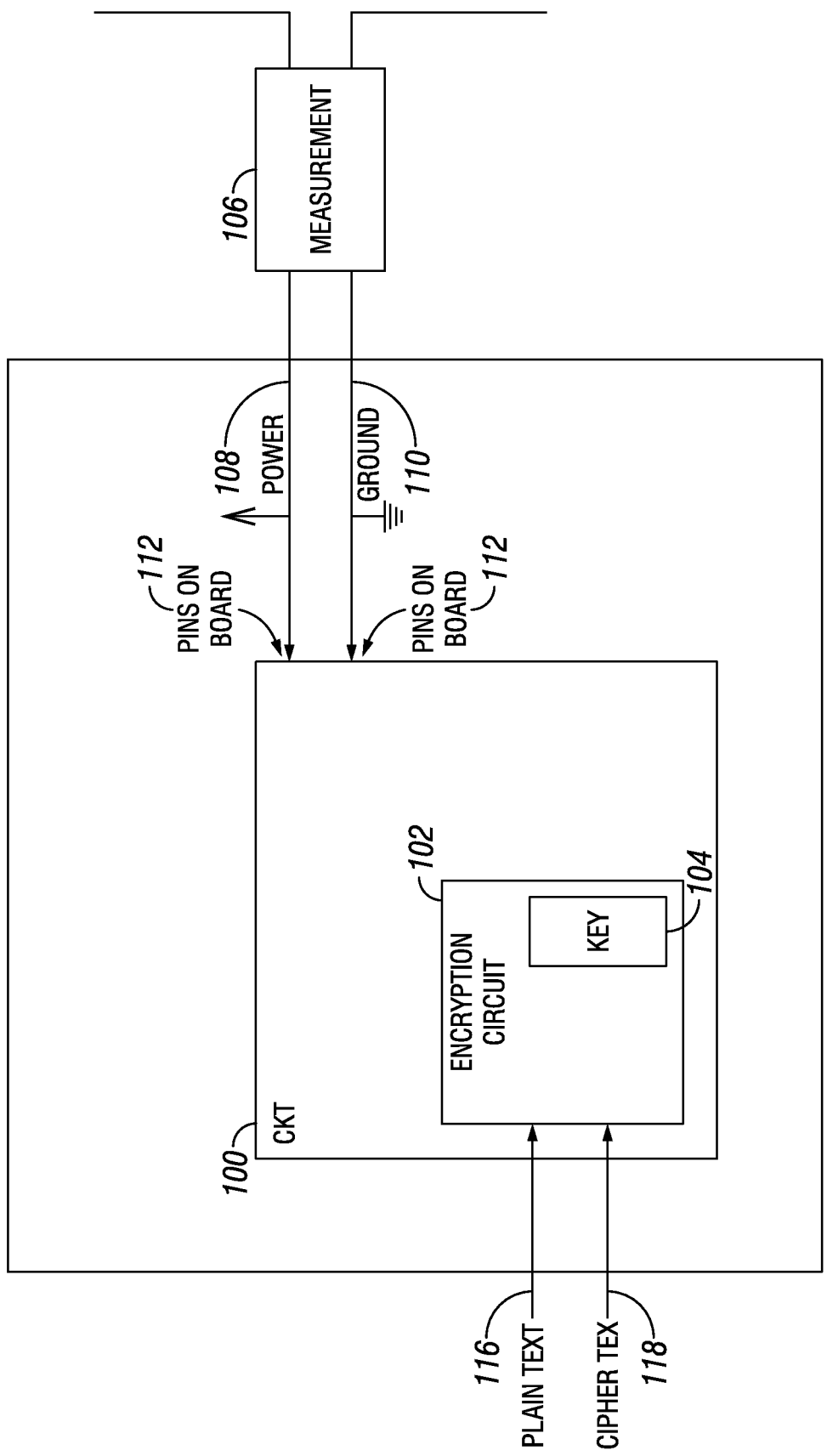
FIG. 1 is a block diagram of a prior art circuit with an encryption circuit portion and a power trace measurement device connected.

FIG. 1 is a block diagram of a prior art circuit with an encryption circuit portion and a power trace measurement device connected. A prior art circuit 100 contains an encryption circuit 102. The encryption circuit 102 contains a key 104 that is required to perform the encryption/decryption of information using the algorithm implemented by the encryption circuit 102. A power line 108 and a ground line 110 together deliver current to the circuit 100 via pins 112. A measurement device 106, such as an oscilloscope, placed across the power line 108 and the ground line 110, is used to measure the amount of current delivered to the circuit 100.

Figure 2A:
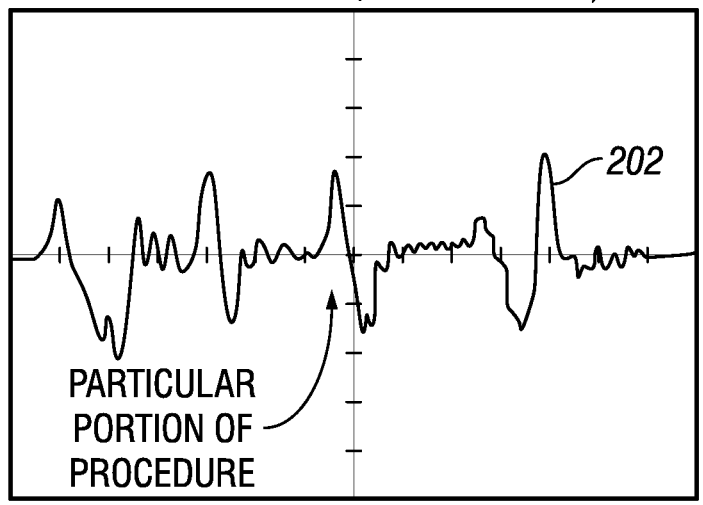
FIG. 2A is a graph illustrating an exemplary power trace of the input current of the prior art circuit of FIG. 1 with an encryption circuit portion.

FIG. 2A is a graph illustrating an exemplary power trace of the input current/wattage of the prior art circuit of FIG. 1 with an encryption circuit portion. An exemplary power trace 202 for the circuit 100 as shown in FIG. 1 is measured by the measurement device 106. The power trace 202 has a y-axis of current and an x-axis of time. The power trace 202 fluctuates over time coinciding with the power drawn by the circuit 100. The fluctuations of the power trace 202 can be specifically linked to the current drawn by the encryption circuit 102. An attacker seeking to extract the key 104 used by the encryption circuit 102 examines the power trace 202 to make inferences about the computations made by the encryption circuit 102 by closely analyzing the fluctuations of the power trace 202. The attacker is further able to infer switching activity within the encryption circuit 102 by sending plaintext 116 or cipher text 118 into the encryption circuit 102. The attacker monitors the amount of switching activity that occurs by monitoring the amount of dynamic power drawn as reflected in the fluctuations of the power trace 202. Combining the information from the power trace 202 with the information from the plaintext 116 or cipher text 118 sent in, the attacker is able to extract the key 104.

Figure 3:
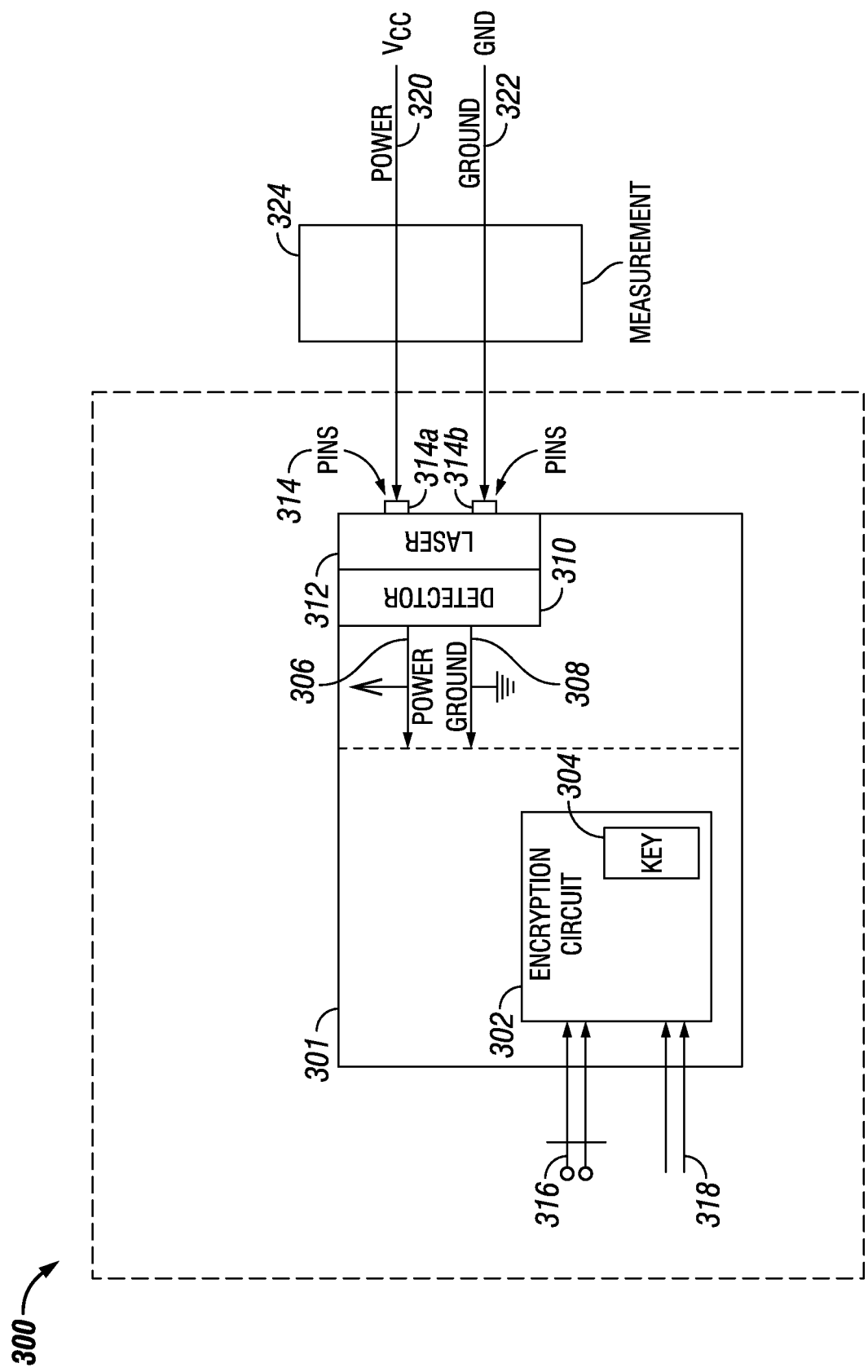
FIG. 3 is a block diagram of an optical source powered circuit, constructed in accordance with a first embodiment of the present disclosure.

FIG. 3 is a block diagram of an optical source powered circuit, constructed in accordance with a first embodiment of the present disclosure. A circuit 300 contains a circuit portion 301 that contains information such as an encryption circuit 302 is powered by a laser 312. The circuit 300 may be part of an integrated circuit that contains other circuits that do not require protection from power-based side channel attacks. An encryption key 304 is stored within the protected encryption circuit 302. For example, the encryption key 304 can be stored in an EEPROM or a set with fuses. The encryption key 304 can also be generated by providing a challenge to a physically unclonable function (PUF). A user seeking to decrypt information produced by the encryption circuit 302 or encrypt data so that it looks like it was produced by the encryption circuit 302 needs the key 304. A user (and/or other parts of the circuit) communicates with the encryption circuit 302 by sending and/or receiving plaintext 316 or cipher text 318. The circuit section 301 can also store information (e.g. as a memory) that must remain secure where the stored information is protected by the encryption provided by the encryption circuit 302.

In this embodiment, the power source is a laser. However, the power source is not limited to a laser. The power source can be an optical source that generates optical energy, such as a light emitting diode (LED) or natural light, including solar or artificial lighting. A semiconductor laser emitting in the 850 to 1600 nanometer (nm) wavelength region is an efficient optical source with efficiencies of 40% to 75% to serve as the power source. LEDs, although less efficient at efficiencies of approximately 20%, are becoming more efficient and can serve as a power source.

Electrical power to the circuit 300 is typically obtained through connections to Vcc and Gnd (or Vss) delivered by a power line 320 and a ground line 322. The power line 320 and the ground line 322 are connected to the circuit 300 via a set of pins 314 that include at least a power pin 314a and a ground pin 314b. The pins 314 are in turn connected to the laser 312. The power line 320 and ground line 322 together deliver electrical power to the laser 312 from Vcc and Gnd. The laser 312 converts the electrical energy (i.e., energy made available by the flow of electric charge through a conductor) into optical energy and emits the optical energy in the direction of a detector 310. The detector 310 may be a photodiode or any other type of photo-sensitive device capable of converting optical energy into electrical energy with a current or voltage. The detector 310 may also be a pin detector, an avalanche photo detector (APD) or other types of semiconductor optical detectors. The detector selected should be matched to the emission wavelength range of the optical source. The current derived from the laser 312 by the detector 310 is used to deliver electrical power to the circuit via an internal power line 306 and an internal ground line 308. The internal power line 306 and the internal ground line 308 are embedded within the circuit and are not accessible by external probes to measure the value of the current being delivered through them.

The electrical current delivered from Vcc and Gnd to the laser 312 through the power line 320 and ground line 322 is a constant value regardless of the actual power drawn by the components in the circuit 300. A measurement device 324, such as an oscilloscope, may be used to measure the amount of current traveling through the power line 320 and ground line 322. However, no information regarding the key 304 will be obtainable by the measurement of the amount of current traveling through the power line 320 and ground line 322 because it is not correlated to the circuit's switching activity.

Figure 2B:
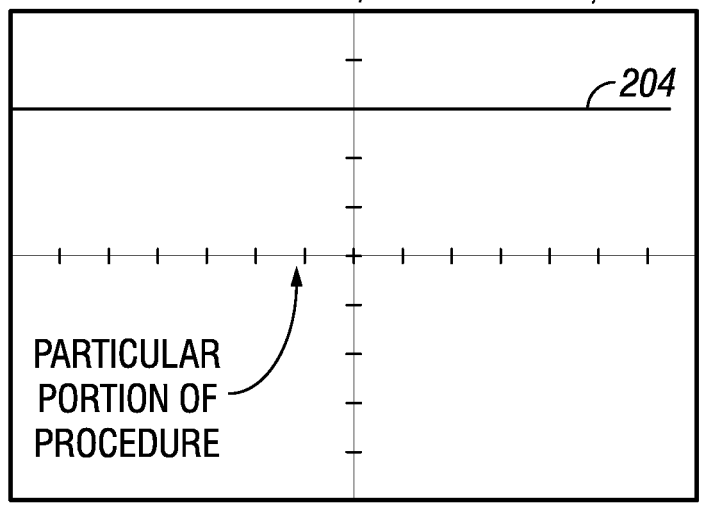
FIG. 2B is a graph illustrating an exemplary power trace of the input current/wattage of an optical source powered circuit with an encryption circuit portion.

FIG. 2B is a graph illustrating an exemplary power trace of the input current of an optical source powered circuit with an encryption circuit portion. An exemplary power trace 204 measured by the measurement device 324 is shown in FIG. 3. The power trace 204 has a y-axis of current and an x-axis of time. The primary difference between the power trace 204 and the power trace 202 as seen in FIG. 2A is that power trace 204 shows no fluctuation correlated with the switching activity in the amount of current drawn by the circuit 300 over time as measured by the measurement device 324. This is because the laser 312 draws a constant current when the circuit 300 is powered on and a current value of zero when the circuit 300 is powered off. The power trace 204 does not fluctuate regardless of the switching activity occurring within the encryption circuit 302. When plaintext 316 and cipher text 318 are sent into the encryption circuit 302 to stimulate switching activity, the power trace 204 remains unchanged.

Figure 4A:
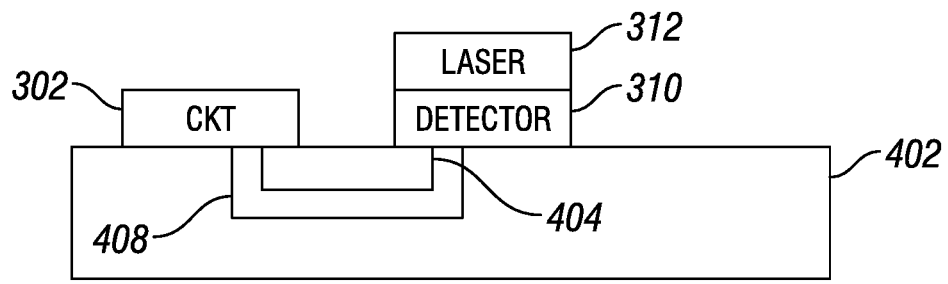
FIG. 4A is a side view of the optical source powered circuit of FIG. 3, with through silicon vias.

FIG. 4A is a side view of the optical source powered circuit of FIG. 3, with through semiconductor vias. The encryption circuit 302 is mounted on a silicon die 402. Although the die is silicon in this embodiment, another material can be chosen depending on the particular application. The detector 310 is mounted onto the silicon die 402. The laser 312 is then mounted in optical linkage with the detector 310 so that the laser light emitted by the laser 312 can be detected by the detector 310. For the laser 312 to be in optical linkage with the detector 310, the laser 312 can be mounted onto the detector 310 itself as shown in the current embodiment. However, the laser 312 can also be mounted onto the silicon die 402 directly (not shown). The optical linkage can be provided by other interconnections between the laser 312 and the detector 310 such as a fiber optic cable (not shown). Power is delivered from the detector 310 to the encryption circuit 302 by an electrical current traveling within the through semiconductor vias (TSVs) that run within the silicon die 402. Although through silicon vias are used in this embodiment, the vias can be constructed from other semiconductor materials dependent on the semiconductor material system chosen for the particular application. There are at least two TSVs that serve as a power trace 404 and a ground trace 408. An attacker seeking to measure the current running through the TSV power trace 404 and the TSV ground trace 408 cannot do so without breaking into the silicon die 402 and causing irreversible damage.

Figure 4B:
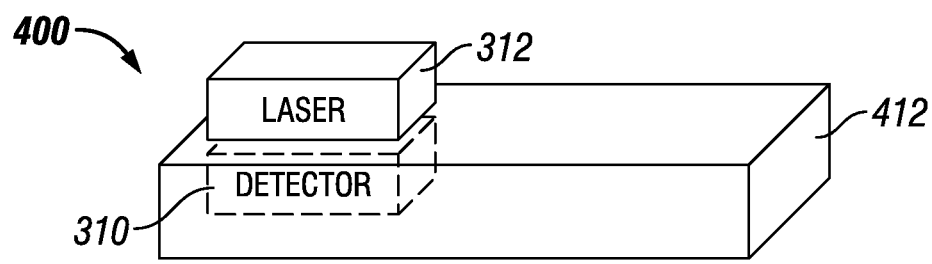
FIG. 4B is a perspective view of the optical source powered circuit of FIG. 3, with the optical detector embedded within a silicon die.

FIG. 4B is a perspective view of the optical source powered circuit of FIG. 3, with the optical detector embedded within a silicon die. The detector 310 is now embedded directly within the silicon die 412 that contains information that must remain secure. The laser 312 is mounted on the surface of the silicon die 412. Embedding the detector 310 within the silicon die 412 provides added protection from physical tampering.

Where the detector 310 is embedded within the silicon die 412, there are several methods of powering the laser 312 that is mounted on the surface of the silicon die 412. The laser 312 remains linked to the detector 310 optically. One method for powering the laser 312 is to utilize TSVs running from the bottom of the package and passing through the silicon die 412 (not shown).

Figure 5:
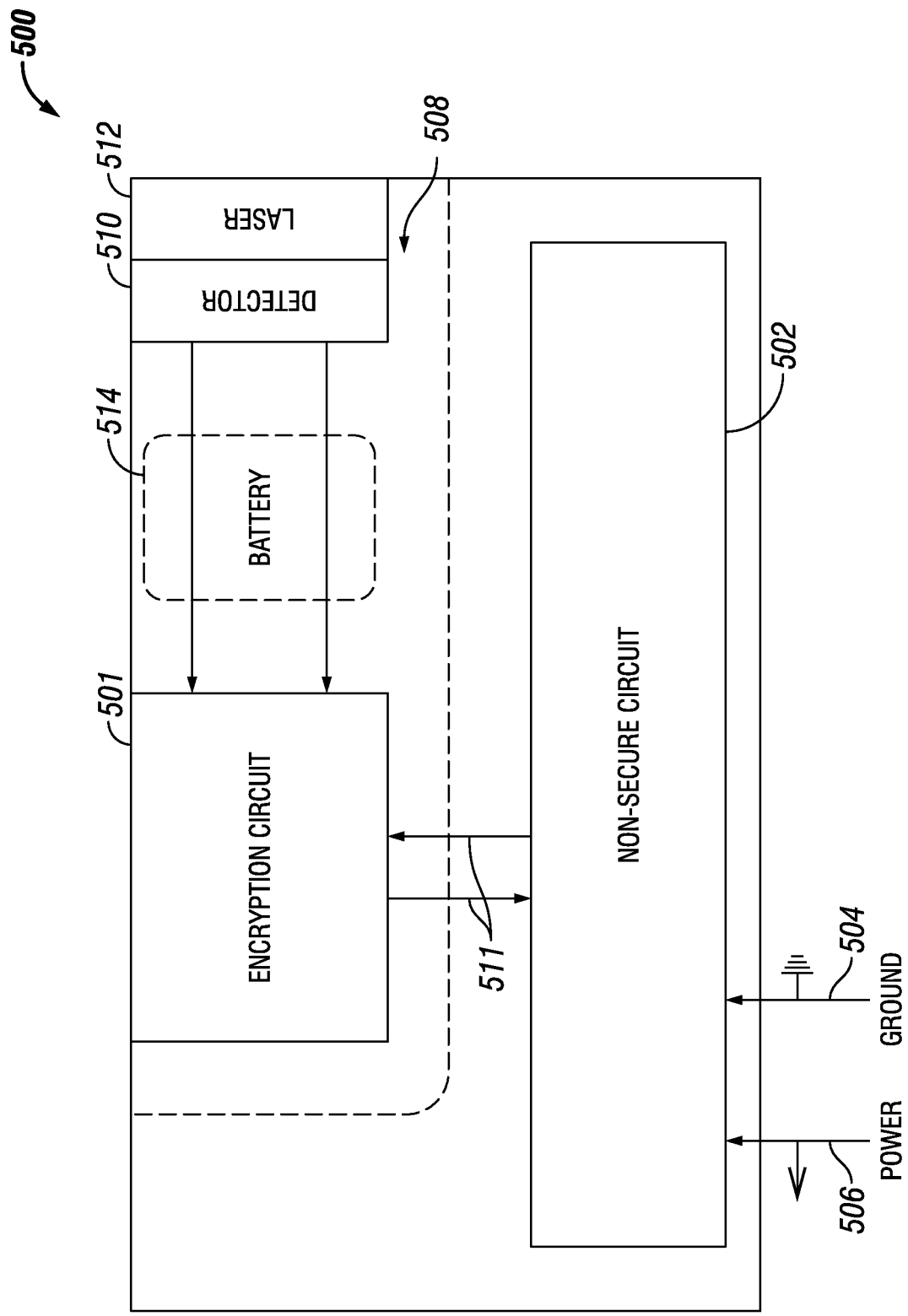
FIG. 5 is a block diagram of an optical source powered circuit, constructed in accordance with a second embodiment of the present disclosure, having a power island.

FIG. 5 is a block diagram of an optical source powered circuit, with an encryption circuit portion, constructed in accordance with a second embodiment of the present disclosure, having a power island. A circuit 500 includes a non-secure circuit portion 502 and the encryption circuit 501 portion. The encryption circuit 501 that requires protection against power analysis attacks is contained within a power island 508. A key (not shown) is stored within the encryption circuit 501. The power island 508 is an isolated power domain wherein power to the encryption circuit 501 is provided separately from the power provided to the non-secure circuit portion 502. The encryption circuit 501 is powered by a set of power and ground lines (not shown) connected to the detector 510. The laser 512 emits laser light that is converted by the optically linked detector 510 into electrical energy. The electrical energy is used to charge a battery 514 that is connected to the detector 510 and the encryption circuit 501. The electrical energy is also passed through the battery 514 to the encryption circuit 501. The battery 514 serves as a backup power source and can power the encryption circuit 501 temporarily when no power is delivered through the laser 512 and the detector 510. This provides added protection to prevent an attacker monitoring the encryption circuit 501 from using power-based fault insertion attacks on the encryption circuit 501. The non-secure circuit portion 502 is powered directly by a separate set of lines that include a power line 506 and a ground line 504. An attacker monitoring the current through the power line 506 and the ground line 504 can only obtain a current trace of the power drawn by the non-secure circuit portion 502 but has no way to infer the power drawn by the encryption circuit 501. Although the encryption circuit 501 is on the power island 508, it is still able to communicate with the non-secure circuit portion 502 through lines 511. The communication in the lines 511 are enabled with digital isolation circuitry (not shown) in both the encryption circuit and the non-secure circuit portion. A controller (not shown) in the integrated circuit can also be configured to switch power delivery to the secure circuit from the power line 506 and a ground line 504 to the electrical energy provided by the detector 510 when the encryption circuit 501 is performing a cryptographic algorithm and back when the cryptographic algorithm is completed.

Figure 6:
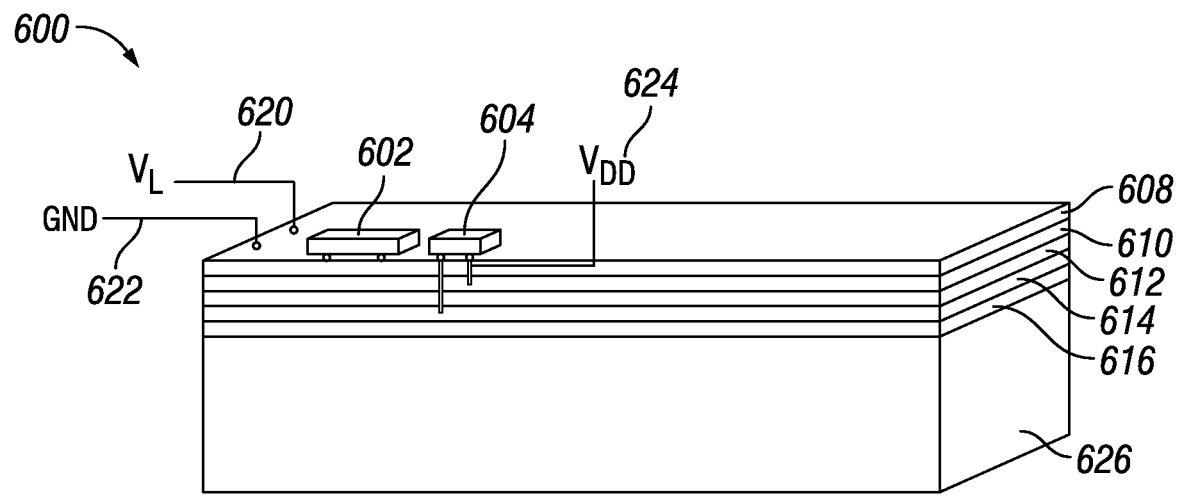
FIG. 6 is a perspective view of an optical source powered circuit, constructed in accordance with a third embodiment of the present disclosure.

FIG. 6 is a perspective view of an optical source powered circuit, constructed in accordance with a third embodiment of the present disclosure. A circuit 600 that contains an encryption circuit (not shown) is powered by a broad area laser 602 that is gallium arsenide (GaAs) based. The broad area laser 602 is an "edge-emitting laser." An example of a broad area laser that would function is an edge-emitting laser having a 100 μm wide stripe with a length of 1000 μm. Although in this embodiment the broad area laser 602 is GaAs based, it can also be based on other material systems such as indium phosphide (InP) alloys or gallium antimony (GaSb) alloys. The broad area laser 602 provides approximately 1 watt (W) of optical power at a selected wavelength of approximately 850 nm and has a drive current of approximately 1.6 amperes (A) at an input voltage of about 1.6 volts (V). The power density of the broad area laser 602 at the emitting aperture is equivalent to about one million (or more) times the power density of the sun at the earth's surface. Electrical power to the broad-area laser 602 is typically obtained through connections to VL and Gnd delivered by a power line 620 and a ground line 622.

The broad-area laser 602 converts the electrical energy from power line 620 into light energy and emits the light energy in the direction of a gallium arsenide based optical detector 604. The optical detector 604 is capable of operating in the photovoltaic mode to produce approximately 700 milliwatts (mW) of electrical power from 300 suns from a surface area of 500 μm$^2$. The direct band gap of a GaAs based optical detector is efficient for monochromatic laser illumination. The far-field intensity distribution of the broad-area laser 602 is elliptical and will have an aspect ratio of between 2:1 to 5:1.

Input power provided to the broad area laser 602 is approximately 2.25 W to produce an output power of 1 W. This is a power conversion efficiency of approximately 44%. After light energy is projected onto the optical detector 604, about 500 mW of electrical power is produced at the output of the optical detector 604. This is a total optical to electrical power conversion efficiency of 22%. With optimization of the optical source and optical detector, efficiencies of greater than 35% can be achieved.

The broad area laser 602 and optical detector 604 are mounted on the surface of a first metallization layer 608. The broad area laser 602 and optical detector 604 are mounted with a spacing on the order of 1 mm apart, allowing the aspect ratio of the optical detector 604 to be optimized to the far-field beam pattern of the broad area laser 602 so the optical detector 604 is uniformly illuminated. Below the first metallization layer 608 is, a second metallization layer 610, a third metallization layer 612, a fourth metallization layer 614, and a fifth metallization layer 616. The encryption circuit (not shown) is buried within the metallization layers (608, 610, 612, 614, 616) and the silicon substrate 626.

Multi-level metallization allows for the optical detector 604 to power the encryption circuit as appropriate. Unlike the power supplied to the broad-area laser 602 by the power line 620 and the ground line 622, the multiple metallization layers (608, 610, 612, 614, 616) are not accessible by external probes. The optical power from the laser 620 results in a secure $V_{DD}$ 624 and a secure ground (not shown) to power the encryption circuit. The only way to access the secure power provided to the metallization layers is by destructive removal of the metallization layers. The encryption circuit (not shown) cannot be probed through the metallization layers and any attempt to access the metallization layers would result in the irreversible destruction of the chip.

In a fourth embodiment of the present disclosure, an optical source powered circuit is constructed with a heat sink. The silicon die, laser, and detector are mounted on a heat sink. The laser is optically linked to the detector so that the laser light emitted by the laser can be detected by the detector. Power is delivered from the detector to the secure circuit by an electrical current running through a power trace and a ground trace.

Note that any and all of the embodiments described above can be combined with each other, except to the extent that it may be stated otherwise above or to the extent that any such embodiments might be mutually exclusive in function and/or structure.

While the present disclosure has been described in conjunction with the embodiments, it will be understood that they are not intended to limit the present disclosure to these embodiments. On the contrary, the present disclosure is intended to cover alternatives, modifications, and equivalents, which may be included within the spirit and scope of the present disclosure as defined by the appended claims. Accordingly, the specification and drawings are to be regarded in an illustrative sense rather than a restrictive sense. Unless otherwise specifically stated, the terms and expressions have been used herein as terms of description and not terms of limitation. There is no intention to use the terms or expressions to exclude any equivalent of features shown and described or portions thereof and this disclosure should be defined in accordance with the claims that follow. For example, the secure circuit being protected does not have to be an encryption circuit but could be another circuit that could contain secret or proprietary information or functionality that could otherwise be compromised through a power analysis attack.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

Any element in a claim that does not explicitly state "means for" performing a specified function, or "step for" performing a specific function, is not to be interpreted as a "means" or "step" clause as specified in 35 U.S.C. § 112, ¶ 6. In particular, the use of "step of" in the claims herein is not intended to invoke the provisions of 35 U.S.C. § 112, ¶ 6.

The invention claimed is:

1. An electronic device for preventing power analysis attack comprising:
   an optical source enabled to output optical energy to an optical detector in response to receiving first electrical power from an electrical power source external to the electronic device;
   a secure circuit enabled to receive second electrical power from the optical detector;
   the optical detector enabled to receive the optical energy and output the second electrical power to the secure circuit,
   wherein the secure circuit, the optical source, and the optical detector are located on an integrated circuit die,
   wherein the optical energy and the second electrical power are isolated within the integrated circuit die,
   wherein the first electrical power is isolated from the second electrical power,
   wherein the first electrical power does not vary in response to consumption of the second electrical power by the secure circuit, wherein the second electrical power is embedded within the electronic device and is not accessible by external probes to measure the second electrical power; and a controller circuit configured to deliver the second electrical power to the secure circuit when the secure circuit is performing an operation that requires security.

2. The electronic device of claim 1, wherein the optical source is a laser.

3. The electronic device of claim 1, wherein the optical source is a light emitting diode.

4. The electronic device of claim 1, wherein the optical detector is a photovoltaic device.

5. The electronic device of claim 1, wherein the optical detector is a photodiode.

6. The electronic device of claim 5, wherein consumption of the second electrical power by the secure circuit further comprises: switching of transistors included in the secure circuit.

7. The electronic device of claim 6, wherein the switching of the transistors results in variations of the second electrical power.

8. The electronic device of claim 1, wherein the secure circuit implements encryption.

9. The electronic device of claim 1, wherein the secure circuit stores a digital key.

10. The electronic device of claim 1, further comprising: a plurality of electrical connections among the secure circuit and the optical detector located on the integrated circuit die.

11. The electronic device of claim 10, wherein the electrical connections are isolated within the integrated circuit die.

12. The electronic device of claim 1, further comprising: external connectors for connecting the optical source to the electrical power source.

13. The electronic device of claim 1, wherein the integrated circuit die is included in a semiconductor device.

14. A method of operating an electronic device for preventing power analysis attack, the method comprising:

receiving first electrical power from an external power source at an optical source enabled to output optical energy in response to receiving the first electrical power;

outputting the optical energy by the optical source;

receiving the optical energy by an optical detector enabled to output second electrical power in response to receiving the optical energy;

outputting the second electrical power by the optical detector;

receiving the second electrical power at a secure circuit enabled to consume the second electrical power, wherein the secure circuit, the optical source, and the optical detector are located on an integrated circuit die, wherein the optical energy and the second electrical power are isolated within the integrated circuit die, and wherein the first electrical power is isolated from the second electrical power, wherein the first electrical power does not vary in response to the second electrical power when the secure circuit consumes the second electrical power, wherein the second electrical power is embedded within the electronic device and is not accessible by external probes to measure the second electrical power; and a controller circuit configured to deliver the second electrical power to the secure circuit when the secure circuit is performing an operation that requires security.

15. The method of claim 14, wherein receiving the first electrical power from the external power source further comprises receiving the first electrical power via external electrical connections on the integrated circuit die.

16. The method of claim 14, wherein the secure circuit is enabled to receive the first electrical power or receive the second electrical power, the method further comprising: selecting between the first electrical power and the second electrical power to power the secure circuit.

17. The method of claim 16, wherein selecting between the first electrical power and the second electrical power further comprises: selecting the second electrical power when the secure circuit is performing a cryptographic operation.

* * * * *